United States Patent [19]
Lardat

[11] 3,893,047
[45] July 1, 1975

[54] ACOUSTIC SURFACE WAVE TRANSMISSION SYSTEM

[75] Inventor: Claude Lardat, Paris, France
[73] Assignee: Thomson-CSF, Paris, France

[22] Filed: Mar. 4, 1974
[21] Appl. No.: 448,083

[30] Foreign Application Priority Data
Mar. 9, 1973 France .............................. 73.08560

[52] U.S. Cl. .................... 333/30 R; 310/9.8; 333/72
[51] Int. Cl. ...... H03h 9/26; H03h 9/30; H03h 9/32
[58] Field of Search ......... 333/30 R, 72; 310/8, 8.1, 310/9.7, 9.8, 8.2, 8.3

[56] References Cited

UNITED STATES PATENTS

| | | | |
|---|---|---|---|
| 3,568,102 | 3/1971 | Tseng | 333/30 R |
| 3,621,482 | 11/1971 | Adler | 333/72 |
| 3,753,164 | 8/1973 | De Vries | 333/30 R |
| 3,766,496 | 10/1973 | Whitehouse | 333/72 X |

OTHER PUBLICATIONS

Ingerbrigtsen–"Linear and Nonlinear Attenuation of Acoustic Surface Waves in a Piezoelectric Coated with a Semiconducting Film," in Journal of Applied Physics, Vol. 41, No. 2, Feb. 1970; pages 454–459.

*Primary Examiner*—James W. Lawrence
*Assistant Examiner*—Marvin Nussbaum
*Attorney, Agent, or Firm*—Roland Plottel

[57] ABSTRACT

A system for processing a signal during its transmission in the form of acoustic surface waves.

A piezoelectric substrate, having transmitting and receiving transducers and at least one grating reflecting transmitted acoustic surface waves, comprises a thin photoconductive layer on the path of the reflected waves. Subjecting the layer-substrate interaction zone to selective illumination of variable intensity leads to the production of an acousto-electric effect having zero electric field, so that the signal is attenuated outside the non-illuminated zones.

The invention is of use particularly for non-dispersive filters and light-controlled delay lines.

11 Claims, 7 Drawing Figures

ACOUSTIC SURFACE WAVE TRANSMISSION SYSTEM

This invention relates to systems for transmitting acoustic surface waves applied to and produced on the surface of a substrate by means of an input electro-acoustic transducer and being processed along their propagation path before being applied to a load circuit by way of an output acousto-electric transducer.

The invention relates more particularly to systems comprising at least one reflective grating embodied by parallel grooves which are inclined at approximately 45° to the direction of the path of the transmitted surface waves.

Construction of the system according to the invention is based on structure technologies and on appropriately combined physical properties of materials according to the invention.

The prior art discloses the use of reflective gratings disposed at an angle of appoximately 45° to the path of the incident acoustic surface waves as a means of constructing various devices such as dispersive filters. These features are disclosed inter alia in an article "Large-Time-Bandwidh — Product Surface—wave pulse compressor employing reflective gratings," by R. C. Williamson and H. I. Smith, published in "Electronics Letters," volume 8, No. 16, pages 401, 402, Aug. 10, 1972, in an article by J. Melngailis et al. "Bandpass surface wave filters" published on pages 221–225 of the "Proceeding of IEEE Ultrasonics Symposium", Oct. 4 – 7, 1972, and in the U.S. Pat. No. 3,568,102 in the name of Tseng. The structures disclosed in such patent specification usually comprise a number of reflective gratings which distribute the energy of the acoustic surface wave at different delay times to corresponding interdigital output transducers.

Also, U.S. Pat. Nos. 3,446,975 (Adler and De Vries) and 3,516,027 (Wasilik) disclosed the use as substrate for surface wave propagation of either a material which is both piezoelectric and photoconductive or solely piezoelectric, the substrate having a deposit of a photoconductive substance on its propagation surface. The deposit is disposed outside the ultrasonic wave propagation path and so does not affect such propagation. Its function is, when illuminated, to interconnect the various electrodes of the transducers by an electric short circuit.

Also, according to an article by K. A. Ingebrigsten "Linear and non-linear attenuation of acoustic surface waves in a piezoelectric coated with a semiconducting film" published in the "Journal of Applied Physics", volume 41, No. 2, pages 454–459, February 1970, it is known to use a thin photoconductive semiconductive layer deposited on a piezoelectric substrate surface. Illumination of such layer produces a zero-field acousto-electric effect due to interaction of the electric field which is associated with the surface wave in the piezoelectric substrate with the charge carriers produced in the semiconductive layer by the illumination. Charge carrier density varies with the illumination, and so the resistivity of the semiconductive layer depends upon such illumination. The acousto-electric effect therefore results in attenuating the acoustic wave to an extent varying with the value of such resistivity.

This invention provides an acoustic surface wave transmission system wherein structures of known technique are combined in an original and novel way, the operation of the system being controlled by the applied illumination or exposure.

The invention provides a transmission system of use inter alia as a non-dispersive filter or as a delay line for the propagation of an acoustic surface wave.

According to a feature of this invention, an acoustic surface wave transmission system is distinguished mainly by the combination on a single piezoelectric substrate of electro-acoustic input and output surface wave transducers, of at least one reflective grating at an inclination to the transmitted wave propagation path, and of at least one photoconductive layer disposed at the output of such grating and subjected to an illumination or exposure producing a zero-field acousto-electric effect in the layer/substrate interaction zone.

Other features and advantages of this invention will be disclosed by the following exemplary description, reference being made to the accompanying drawings wherein.

Figure 1:
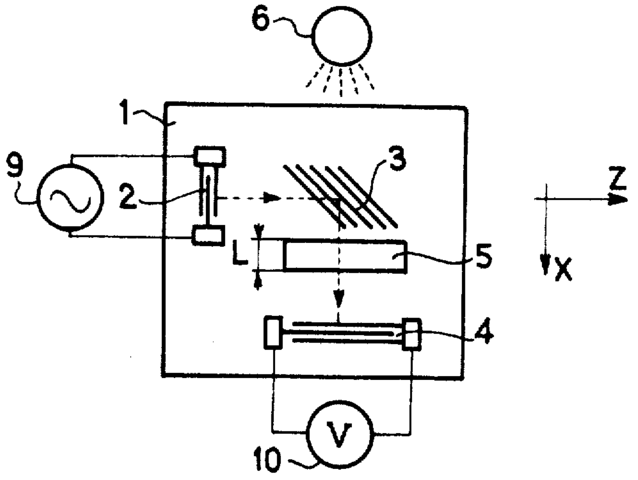
FIG. 1 is a simplified diagram showing the structure of the acoustic surface wave transmission system according to the invention, the diagram being intended mainly to explain the operation of such system.

The simplified diagram of FIG. 1 shows a basic structure for an acoustic surface wave transmission device according to a prior art technique modified in accordance with the invention; the diagram is intended mainly to clarify the novel combination and its operation.

In its simplest form, e.g. as described in the article previously mentioned by Melngailis et al, the device comprises a piezoelectric substrate 1 having on one of its surfaces an input electro-acoustic transducer 2, a reflective grating 3 disposed at an inclination to the direction $z$ of the radiation path of the transmitted surface waves, and an output acousto-electric transducer 4 receiving waves reflected by the grating 3 in the direction $x$. Advantageously, transducers 2, 4 are of the interdigital comb kind, the teeth of which extend in two directions $z$ and $x$ which are perpendicular to one another. Grating 3 is embodied by mechanical or electrical discontinuities which are parallel to one another and at an inclination of approximately 45° to the incident wave direction $z$. The same article specifies that in the case of a Y-cut lithium niobate substrate 1, the discontinuities take the form of 77 engraved lines having the same length, spacing and depth and making an angle of 46.81° with the substrat axis $z$.

A number of reflective gratings and a number of transducers can be disposed on the surface of substrate 1. Also, the input transmitting transducer, as 2, is in all cases connected to a source 9 producing an electric signal for transmission, and the output receiving transducer, as 4, in all cases outputs into a load 10.

Accordingly, the invention comprises the combination of an adjustable-absorption substance 5, such as a photoconductor, with the structure just mentioned, and the addition, if the material 5 is photoconductive, of a lignt source 6 adapted to control the operation of the transmission system in accordance with the light incident on the material 5.

To this end a thin photoconductive layer 5 is deposited on the substrate surface between grating 3 and the receiving transducer 4.

As is known, inter alia from the article previously referred to by Ingebrigsten, a zero-electric-field acousto-electric effect appears upon the illumination of layer 5, due to interaction of the electric field which is associated with the surface wave in the substrate 1 with the charge carriers produced in the adjacent photoconductive layer 5 by the illumination thereof. The result of this effect is to attenuate the acoustic wave to an extent varying with the value of the resistivity of layer 5, the resistivity depending upon the illumination or exposure of the layer 5.

Figure 2:
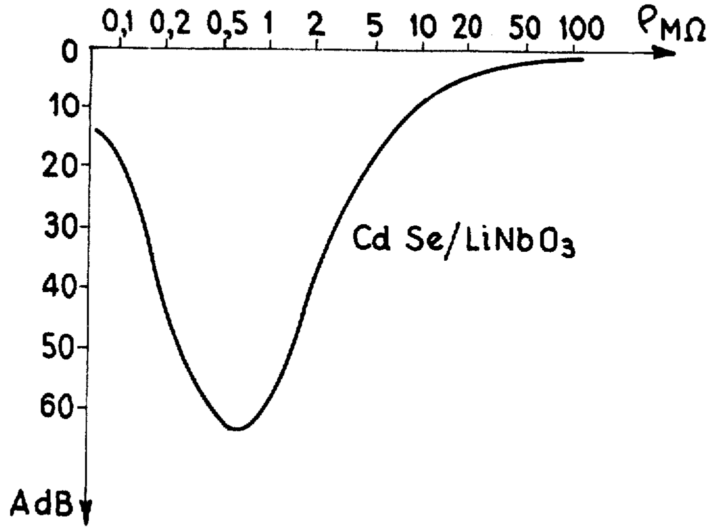
FIG. 2 shows a graph showing the attenuation, plotted against photoconductive layer resistivity, of a signal transmitted by such a system having a particular structure.

The diagram shown in FIG. 2 is given as an example and shows how the attenuation A in dB varies in dependence upon the resistivity $\rho$ in megohms at an input signal frequency of 175 MHz, in the case of a structure consisting of a lithium niobate substrate 1 and a cadmium sulphide layer 5 less than 0.5 $\mu$ thick, the length L of the interaction zone being 2 mm; illumination is provided by a light source 6 which is, with advantage, a glow-lamp. The diagram shows a peak attenuation of more than 60 dB for a resistivity of from 0.5 to 1 megohm, which virtually corresponds to disappearance of the transmitted acoustic wave. Consequently, if the layer 5 is illuminated through an optical mask having parts which are light-transparent and opaque parts, a localized attenuation can be provided so that the acoustic wave can be propagated only by way of the non-illuminated parts. A similar result is obtained if the layer 5 is deposited only on the paths where surface wave propagation is to be inhibited.

FIGS. 3 to 7 show how this phenomenon can be used and what its practical applications are.

Before describing the transmission systems shown in FIGS. 3–7, it should be noted that the phenomenon used in this invention differs from the phenomenon used inter alia in the aforesaid prior art known from U.S. Pat. Nos. 3,446,975 and 3,516,027, due to the fact that in these disclosures the photoconductive material is deposited outside the ultrasonic wave propagation path and therefore has no effect on such propagation. The function of the photoconductor is, when illuminated, to interconnect by an electrical short circuit the various electrodes of the transducers on which it is disposed. For optimum short circuiting — i.e., minimum resistivity — illumination must be as large as possible, whereas in the devices according to this invention illumination is chosen at an optimum value to suit the particular attenuation required.

Figure 3:
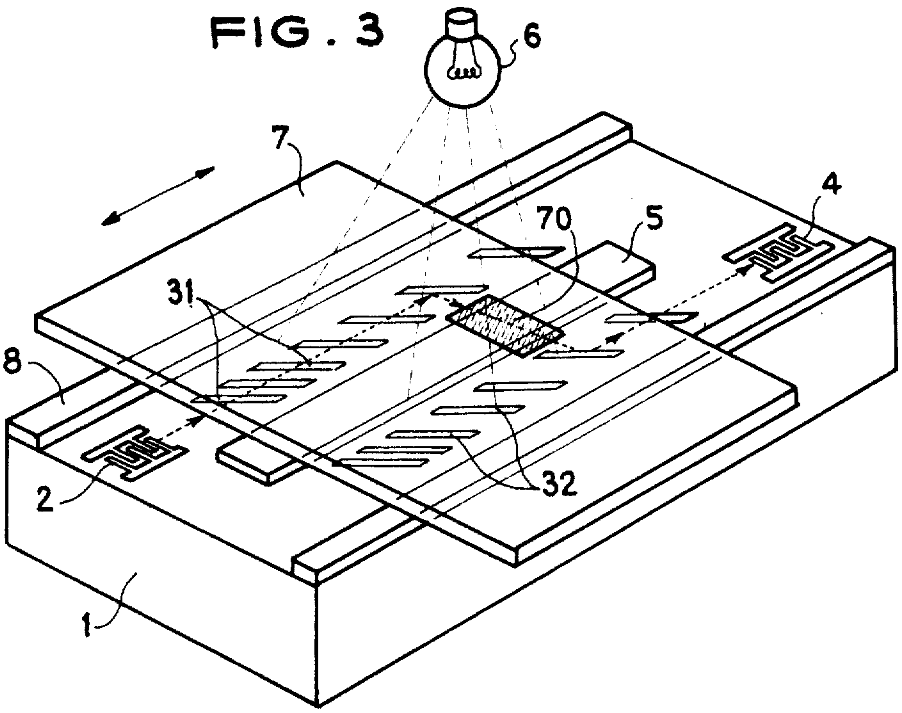
FIG. 3 is a perspective view of the system according to the invention used as a non-dispersive bandpass filter.

The basic structure used in the system shown in FIG. 3 is similar to the structure shown in FIG. 1 (*b*) described in the article previously referred to by Melngailis et al and comprises a piezoelectric substrate 1 whose surface has on it an interdigitated transmitting transducer 2, a first grating 31 of lines engraved at a varying specing and inclined at approximately 45° to the path of the transmitted acoustic surface wave, a second grating 32 identical to the grating 31 and disposed parallel thereto, and a receiving transducer 4 which receives the wave after its consecutive reflection by the gratings 31, 32. A structure of this kind is of use as a non-dispersive bandpass filter.

This structure is modified according to the invention by the addition of a thin photoconductive layer 5 which is deposited between the gratings 31 and 32, thus making it possible to device acoustic surface wave transmission systems suitable for a variety of uses. Layer 5 is illuminated by means of a lamp 6, for instance, of the tungsten filament kind, through an optical mask 7 which has opaque zones, as 70, and which is carried on ledges 8 whose thickness is, with advantage, chosen, very slinghtly greater than the thickness of the layer 5 — i.e., e.g. of the order of 1 $\mu$ — the ledges 8 being disposed outside the propagation path on the substrate 1. An opaque zone 70 of a given length in mask 7 corresponds in the system to a particular frequency bandwidth, because of the dispersive nature of the gratings 31, 32, for the reason that, when the layer 5 is illumunated through mask 7, the acoustic waves can be propagated only in that region which is below the opaque zones 70, and so the extent of such region corresponds to a particular frequency band.

If the mask 7 can be moved parallel to the path of the transmitted acoustic waves along the ledges 8, which then serve as rails, the device becomes a non-dispersive filter having a constant frequency bandwidth and a variable central frequency. To provide a non-dispersive filter having a fixed or variable central frequency and a variable bandwidth, the extent of the opaque zones 70 can be varied.

For instance, using a basic structure thus modified and a cadmium sulphide layer 5 of 0.5 $\mu$m thickness and having a length L of 1.5 mm, attenuation being something like 45 dB, an opaque zone 70 which is 1 cm in length gives a 10 MHz bandwidth centred around 200 MHz. Varying this length between 5 mm and 10 cm provides bandwidths varying from 5 to 100 MHz.

Figure 4:
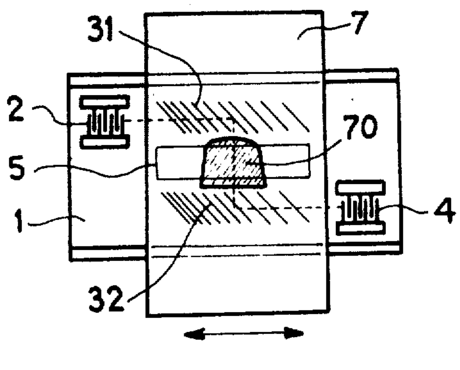
FIG. 4 is a simplified diagram of the system according to the invention used as a non-dispersive filter having a weighted frequency band.

The diagrammatic view of FIG. 4 shows a non-dispersive weighted-band filter which is produced by giving an appropriate shape to the mask opaque zone 70 or — which comes to the same thing — by depositing the layer 5 outside a zone having a particular shape.

Figure 5:
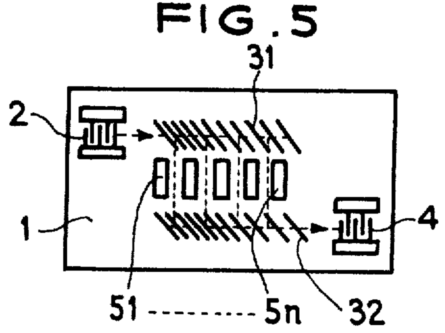
FIG. 5 is a simplified diagram of the system according to the invention used as a non-dispersive comb filter.

Similarly, and as the diagrammatic view of FIG. 5 shows, an interdigital filter can be provided either by splitting the layer 5 into portions 51 to 5*n* at a selected spacing or by providing a number of appropriately spaced opaque zones, as 70, on mask 7. Another possibility is to shape the zones to provide an interdigital weighted-band filter.

The invention is also used for structures wherein the gratings 31, 32 are other than of the dispersive kind.

Figure 6:
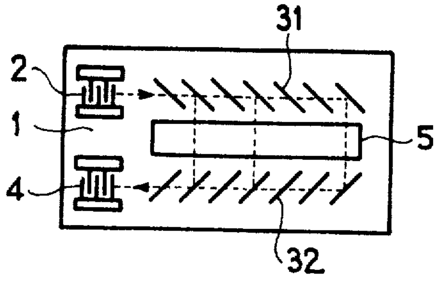
FIG. 6 is a simplified diagram of the system according to the invention used as a variable-delay line.

FIG. 6 shows one such structure wherein the gratings 31, 32 are identical and consist of evenly spaced engraved lines; advantageously, the two gratings are also symmetrical of one another in relation to the photoconductive layer 5. When the same is illuminated through a mask 7 having just one opaque zone 70 and when such zone is moved along layer 5, a non-dispersive variable-delay line is provided.

If the mask remains stationary and is provided with a number of spaced-apart opaque zones, an amplitude-coded line is provided.

Figure 7:
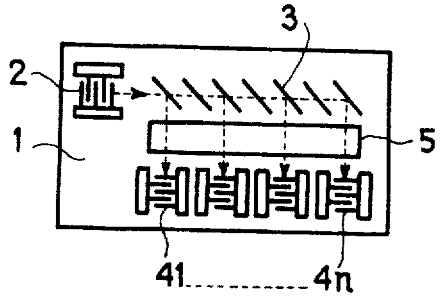
FIG. 7 is a simplified diagram of the system according to the invention used as a tapped delay line.

FIG. 7 shows a non-dispersive delay line having intermediate tap switching. The structure used for this purpose is similar to the one described in U.S. Pat. No. 3,568,102 previously mentioned, which structure comprises a single piezoelectric substrate 1 having on it a transmitting transducer 2, a constant-pitch reflective grating 3 inclined at about 45° to the path of the transmitted wave, and *n* receiving transducers 41 to 4*n*. According to the invention, the photoconductive layer 5 is disposed between the grating 3 and the transducers 41 to 4*n*. Programmable switching of the transducers can be provided, e.g. by altering the position of the opaque zones of the mask.

In the examples described only a single transmtting element, referenced 2 is provided on a substrate. Every one skilled in the art can realise that a number of such elements, of the same kind or of different kinds, can be provided on a single substrate, such as a filter followed by a delay line or vice versa.

What is claimed is:

1. Acoustic surface wave transmission device using means cooperating in a combination comprising:

a piezoelectric substrate having on one face transducers between which the acoustic surface waves propagate; at least one transmitting electro-acoustic transducer connected to an electric signal source and producing the transmitted acoustic waves; at least one acousto-electric transducer receiving the waves and outputting to a load; at least one reflective grating constituted by a series of discontinuities parallel to one another at an inclination to wave propagation direction redirecting the transmitted wave; characterised in that the device also comprises at least one thin photoconductive layer (5) disposed on the substrate (1) between the grating (3) and the receiving transducer (4), a light source (6) to cause illumination of said layer so as to make use of the zero-electric-field acousto-electric effect arising from interaction between the layer when illuminated and the acoustic surface wave, and means to allow said zero effect to take place only at given regions of said substrate between said grating and said receiving transducer.

2. A device according to claim 1, characterised in that it comprises two identical parallel gratings (31, 32) with the discontinuities spaced apart at a predetermined increasing pitch, the thin layer (5) being disposed between the gratings, the resulting interaction zone having a particular length in the transmitted wave propagation direction, said layer not being illuminated over at least a part of said length.

3. A device according to claim 2, characterised in that it comprises a moving mask (7) having at least one opaque zone (70) disposed opposite the thin layer (5), the opacity, the area and the shape of said zone and the position thereof relatively to the grating determining the operating characteristics of the resulting non-dispersive band pass filter.

4. A device according to claim 3, characterised in that the opaque zone (70) has a particular shape such that the frequency band of the non-despersive filter is weighted.

5. A device according to claim 3, characterised in that the mask (7) has a number of different opaque zones (70) to provide an interdigital non-dispersive filter.

6. A device according to claim 1, characterised in that the thin layer (5) is distributed over the substrate (1) in a number of different portions (51 to 5*n*) having a predetermined spacing, to provide a non-dispersive interdigital filter.

7. A device according to claim 6, characterised in that the thin layer (5) extends over areas having a particular shape corresponding to a predetermined weighting of the frequency band of the device.

8. A device according to claim 1, characterised in that it comprises two identical parallel gratings (31, 32) with a constant spacing between the discontinuities, the thin layer (5) being disposed between the two gratings and being selectively removed from illumination by an opaque mask.

9. A device according to claim 8, characterised in that the mask comprises a number of opaque zones and its position is fixed, to provide an amplitude-coded line.

10. A device according to claim 8, characterised in that said mask is a moving mask whose position determines the delay time of the non-dispersive delay line thus devised.

11. A device according to claim 1, characterised in that it comprises, on said substrate (1), a single transmitting transducer (2), a constant-pitch reflective grating (3) to redirect the transmitted wave, a series of receiving transducers (41 to 4*n*) and a thin layer (5) disposed on the substrate (1) between the grating (3) and the receiving transducers (41 to 4*n*), which transducers are positioned in an alignment dependency with regard to said layer, and an opaque moving mask disposed opposite a part of the thin layer (5) whose position is adjustable so as to allow the redirected wave to propagate towards one of said receiving transducers, the device thus providing a tapped line whose switching is programmable by alteration of mask position relatively to the layer (5).

* * * * *